United States Patent [19]
Truckenmiller et al.

[11] Patent Number: 5,455,619
[45] Date of Patent: Oct. 3, 1995

[54] VIDEO DISTRIBUTION SYSTEM ADDRESSING DEVICE FOR IDENTIFYING REMOTE LOCATIONS

[75] Inventors: Steven D. Truckenmiller; Mark D. Schulz; Christopher A. Cinco; Leon P. Stoel; Vernon E. Hills, all of Sioux Falls, S. Dak.

[73] Assignee: LodgeNet Entertainment Corporation, Sioux Falls, S. Dak.

[21] Appl. No.: 146,330

[22] Filed: Nov. 1, 1993

[51] Int. Cl.$^6$ ........................................ H04N 7/16
[52] U.S. Cl. ........................... 348/8; 348/3; 455/3.3; 455/2
[58] Field of Search ................. 348/3, 6, 7, 8, 348/10, 12, 13, 1, 2; 455/2, 3.1, 3.3, 4.1, 4.2, 5.1, 6.1, 6.2; 358/86, 85, 84; H04N 7/16, 7/167, 7/10

[56] References Cited

U.S. PATENT DOCUMENTS

| | | |
|---|---|---|
| 3,919,463 | 11/1975 | Walding . |
| 4,439,784 | 3/1984 | Furukawa et al. . |
| 4,864,519 | 9/1989 | Appleby et al. . |
| 4,988,977 | 1/1991 | Payne et al. . |
| 5,020,129 | 5/1991 | Martin et al. . |
| 5,194,947 | 3/1993 | Lowcock et al. . |

FOREIGN PATENT DOCUMENTS 0080077  5/1984  Japan ........................................ 358/86

OTHER PUBLICATIONS

Lewis, Philip, "Pojects and products" NAEB Journal May–Jun. 1960.
Lancaster, P. W. "The Intelligent Tap" Cable Television Engineering vol. 11, No. 5 Aug. 1979 pp. 230–234.
"Out–Of–Home Addressable Security Is Now A Reality" by VITEK Electronics, Inc.

Primary Examiner—David E. Harvey
Attorney, Agent, or Firm—Kinney & Lange

[57] ABSTRACT

The present invention is an electronic room address tag which associates an address with a remote location in a video distribution system. The video distribution system includes a central distribution point, a plurality of remote locations having at least one video control terminal located at each remote location, and a communication link for carrying signals between the central distribution point and the video control terminals at each remote location. The electronic room address tag is connected to the communication link and located at each remote location separate from the video terminal. The address is stored in the video control terminal and is accessible from the central distribution point through the communication link for tracking guest video selection and video control terminal use.

18 Claims, 3 Drawing Sheets

VIDEO DISTRIBUTION SYSTEM ADDRESSING DEVICE FOR IDENTIFYING REMOTE LOCATIONS

BACKGROUND OF THE INVENTION

The present invention relates to hotel entertainment systems. More particularly, the present invention relates to an electronic address tag for associating a unique address with a hotel room for tracking system use of hotel television and/or pay-per-view movie systems.

In the hotel business, maximizing guest satisfaction is a priority. Any customer dissatisfaction or guest frustration can cause complaints which ultimately result in a loss of revenue. One area in which a hotel guest expects a high standard of performance is in the proper functioning of entertainment equipment provided in the guest room.

The hotel television and pay-per-view movie system is both a source of entertainment for the guest and a means to collect revenue for the hotelier. These video entertainment systems usually must include a method for identifying guest movie selections and tracking entertainment system use for billing purposes. One such method includes the use of a unique address which associates a unique address with each hotel guest's television. Typically, the address is located in the television's control box. The television control box is usually located inside or next to the television.

When a hotel guest watches a pay-per-view movie on the television, the cost of the movie is charged to the unique address. When the hotel guest checks out of the hotel, the guest pays for all pay-per-view movies billed to that unique address.

Typically, when a hotel guest is paying his or her bill, the guest is in a hurry to check out and leave the hotel. Great dissatisfaction occurs if the hotel guest is improperly billed. Improper billing may result in a loss of revenue to the hotel due to the loss of repeat business from an unhappy hotel guest or loss of revenue due to improper billing.

Hotel entertainment systems having unique addresses associated with each guest's television have presented many problems. For example, in a typical hotel pay-per-view system having a centralized movie distribution center with a television in each guest room, each television has a unique electronic address. Commonly, a permanent serial number or address is assigned to each television at the time of manufacture. When the television is installed in a room, the specific television address is assigned to the guest's room. In this situation, an installer must correctly read and record the television address from a label on the television, carry that address information to the movie distribution center, and then enter the address into a distribution center data base. This type of manual procedure is often prone to error, especially considering the fact that room occupancy usually precludes obtaining guest room television addresses in sequential order.

Once installation is complete, the televisions are subject to periodic or emergency maintenance. Every time a television is replaced in a room for maintenance purposes, personnel must re-open the data base at the distribution center, delete the old address and manually type in the new address for the guest room television being placed into service. This operation is very vulnerable to human error. If an error is made, the hotel will not be able to track entertainment system use for each corresponding guest room for billing purposes.

An alternate system which was designed to solve the above problems includes a manually settable device located at each guest room television for setting the address corresponding to the guest room number. This system is still prone to user error, since it relies on personnel who may be under pressure from an unhappy guest to fix the television quickly, and may forget to readdress the television being installed. This system is also vulnerable to guests who attempt to change the settable address to that of another hotel guest room to escape paying for movies.

In use, these types of systems not only result in lost revenues due to billing errors, but also result in irate guests who may be incorrectly billed because of mixed-up television addresses.

Similar problems occur within cable TV (CATV) systems. In a CATV system, typically a unique customer address is located in a control box. The control box is located inside a customer's residence, usually next to the TV. If the control box is replaced for maintenance reasons, maintenance personnel must enter a customer's private home and either manually change or manually record a customer number for future database entry. This method results in unnecessary customer disturbance and is also prone to human error of maintenance personnel.

SUMMARY OF THE INVENTION

The present invention is an electronic room address tag which associates an address with a remote location in a video distribution system. The video distribution system includes a central distribution point, a plurality of remote locations having at least one video control terminal located at each remote location, and a communication link for carrying signals between the central distribution point and the video control terminals at each remote location.

The electronic room address tag is connected to the communication link and located at each remote location separate from the video terminal. The address is stored in the video control terminal and is accessible from the central distribution point through the communication link for tracking guest video selection and video control terminal use.

DETAILED DESCRIPTION OF THE PREFERRED EMBODIMENTS

In a hotel, it is common to find a hotel entertainment system which usually includes a pay-per-view movie system. The entertainment system usually consists of a central distribution center with a communication cable link to each hotel guest room. Each hotel guest room typically includes a television with a control box and a remote control unit. A hotel guest selects a television channel for viewing by operating the remote control unit which sends an infrared signal to the television control box indicating the channel selected.

Although most television programming is available to the hotel guest free of charge, there are some channel selections, such as pay-per-view movies, which the guest is charged for per viewing. Like standard television programming, a guest may select these movies by using the remote control unit to send an infrared signal to the television control unit. In order to bill the guests for viewing these particular channel selections, the guest's television control unit is linked by cable to a central computer located in the central distribution center which receives signals, for billing purposes, whenever a non-complimentary channel or function (e.g., movie, video game or other service) is selected. The central computer identifies the guest selection and tracks the charges which accrue from each individual guest room and compiles these charges for payment at check-out. The electronic room address tag of the present invention connects to the existing communication cable in the hotel guest room and works with the central computer system and television control unit to allow the central computer to identify which hotel guest room made a particular non-complementary selection and subsequently distribute the selected channel or function to the hotel guest room, and also track the charges which accrue from each individual guest room from viewing that selected channel or function, compiling these charges for payment at check-out.

Figure 1:
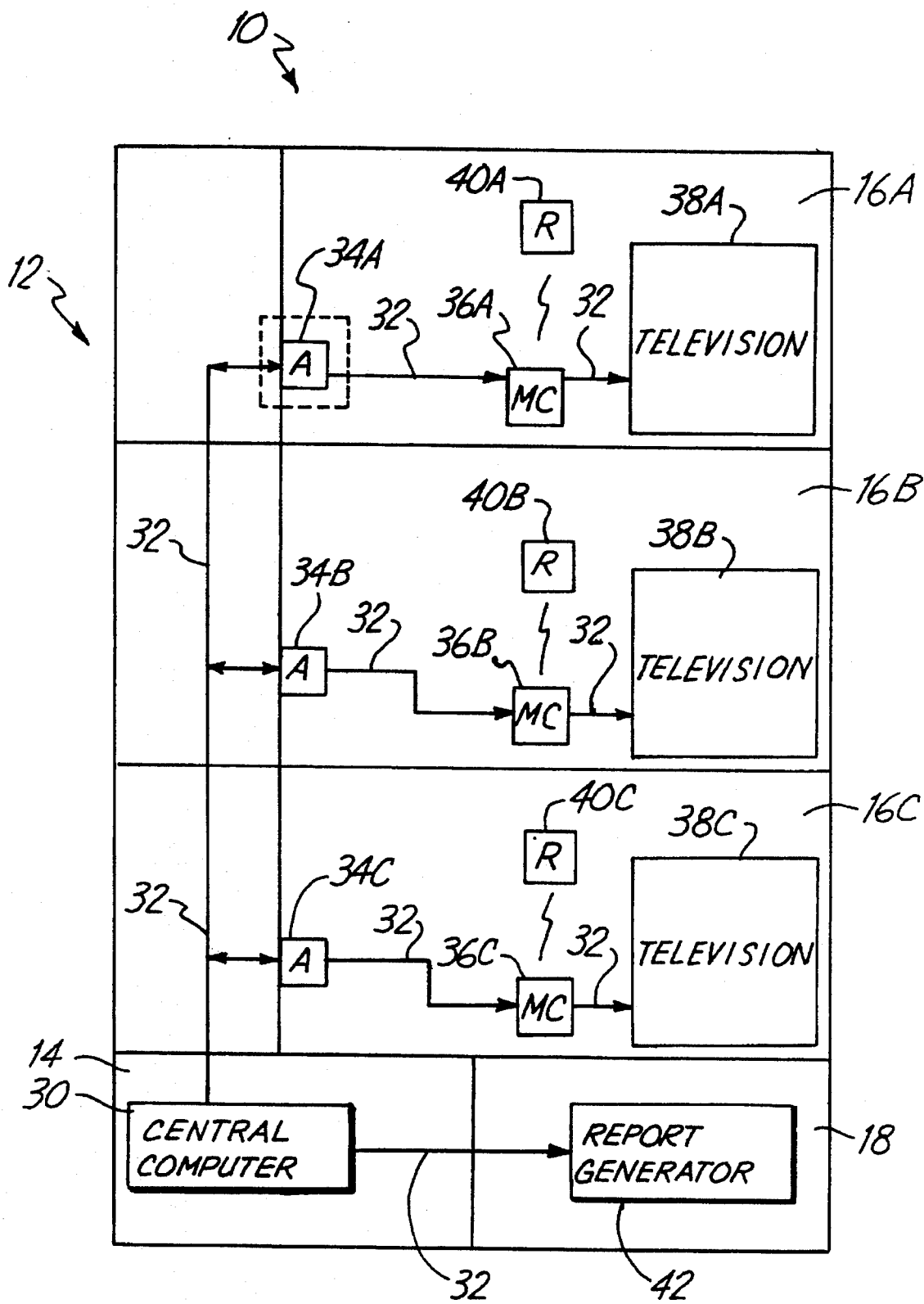
FIG. 1 is a diagram of a typical hotel video distribution system which includes the electronic address tag of the present invention.

FIG. 1 shows a diagram of a hotel 10 having a video distribution system 12. Specifically, hotel 10 includes video distribution center 14, hotel rooms 16A, 16B, and 16C, and check-out area 18. The video distribution system 12 includes central computer 30, communication cable 32, electronic room address tags 34A, 34B, and 34C, microcontrollers 36A, 36B, and 36C, televisions 38A, 38B, and 38C, remote control units 40A, 40B, and 40C, and report generator 42.

Central computer 30 is located in video distribution center 14. Communication cable 32 extends from video distribution center 14 through hotel 10 to each guest hotel room 16 and to check-out area 18. More specifically, communication cable 32 connects central computer 30 with electronic address tags 34A, 34B and 34C, microcontrollers 36A, 36B and 36C, and televisions 38A, 38B and 38C. Communication cable 32 also connects central computer 30 with report generator 42.

For example, when communication link 32 enters room 16A, communication link 32 first passes through electronic room address tag 34A, and then on to microcontroller 36A. Microcontroller 36A may be located next to television 38A or it may be part of television 38A itself. When microcontroller 36A is located next to television 38A, an additional external communication link 32 connects microcontroller 36A to television 38A. Although remote control unit 40A may be physically connected to microcontroller 36A, typically, remote control unit 40A communicates with microcontroller 36A through the use of an infrared communication signal. The above-explained setup is typical of each hotel room 16A, 16B, 16C, etc., for as many rooms as necessary in a particular hotel.

After an electronic room address tag is first installed, each hotel room number is entered into the room microcontroller using a remote control unit infrared. For example, room number 16A is entered into microcontroller 36A using remote control unit 40A. The room number is stored in non-volatile memory within the microcontroller. Storing the room number in non-volatile memory allows the microcontroller to retain the number when power is lost to the microcontroller.

Each electronic room address tag 34A, 34B and 34C has a unique address. After an electronic room address tag is installed, such as electronic room address tag 34A, for example, microcontroller 36A is powered up. When microcontroller 36A is powered up, it reads the unique address of electronic room address tag 34A and stores it in non-volatile memory. Microcontroller 36A reads electronic room address tag 34A's unique address using digital DC pulses from microcontroller 36A, as discussed below. Next, room number 16A is entered by the initial system installer into microcontroller 36A using remote control unit 40A. This procedure is repeated correspondingly for hotel rooms 16B and 16C. Once this procedure is complete, all of the room numbers are entered into central computer 30 by the initial system installer.

Central computer 30 then polls each room microcontroller by room number. When a given room number is polled, such as hotel room 16A, for example, microcomputer 36A then associates an index number with room number 16A and electronic room address tag 34A address. That index number is then used for polling purposes.

Once the electronic room address tag installation procedure is complete, the central computer can accurately track guest non-complementary service selection and use for billing purposes. Central computer 30 continually polls each hotel room 16A, 16B, 16C, etc. For example, when the system is used by a guest to select a non-complementary movie for viewing, the guest, staying in room 16A selects a movie using the following procedure: first, the guest uses remote control unit 40A to make a movie selection. The available movies may be identified either by a menu shown on television 38A, or, alternatively, the available movies may be indicated in a hotel guide. Using remote 40A, the selected movie is signalled to microcontroller 36A through an infrared signal. When central computer 30 polls room 16A, microcontroller 36A notifies central computer 30 of the movie selection. Using the same communication link 32, central computer 30 then distributes the selected movie to television 38A through microcontroller 36A on a real-time basis.

Central computer 30 distributes the movie selection at a unique frequency through communication cable 32 to television 38A. The hotel guest may view the movie on a real-time basis as it is transmitted from central computer 30 or, alternatively, the movie may be downloaded into a memory located in microcontroller 36A to be viewed at a later time by the hotel guest.

During this whole procedure, central computer 30 uses electronic room address tag 34A's unique address stored in microcontroller 36A for polling, movie selection identification and movie distribution purposes. Central computer 30 then charges the cost for viewing the movie to room 16A. This procedure is repeated for every movie or other non-complementary function ordered by a guest in room 16A. When it is time for the hotel room guest to check out at check-out area 18, central computer 30 sends a billing statement to report generator 42 to list guest usage of such non-complementary services.

When a microcontroller is moved to another room or replaced for maintenance purposes and subsequently powered up, the microcontroller reads the corresponding electronic room address tag for that hotel room. If the electronic room address tag does not match the electronic room address tag stored in the microcontroller's memory, the microcontroller erases the room number, poll index number, and electronic address previously stored in memory. The microcontroller then stores the electronic room address tag's address in memory. Next, when the central computer polls the room and receives only an electronic address, the central computer stores the previously corresponding room number and index number with that electronic address in the microcontroller. Alternatively, the central computer may recognize that address codes have changed and alert an operator at the central computer that a microcontroller has been moved from one hotel room to another.

The electronic room address tag solves the past tracking problems when microcontrollers are moved from one hotel room to another. It also solves the tracking problems which occur when microcontrollers are changed out for maintenance purposes. With the use of an electronic room address tag, the microcontrollers become interchangeable, with the central computer still being able to track each hotel room's use of non-complementary channels and functions for selection and billing purposes.

Figure 2:
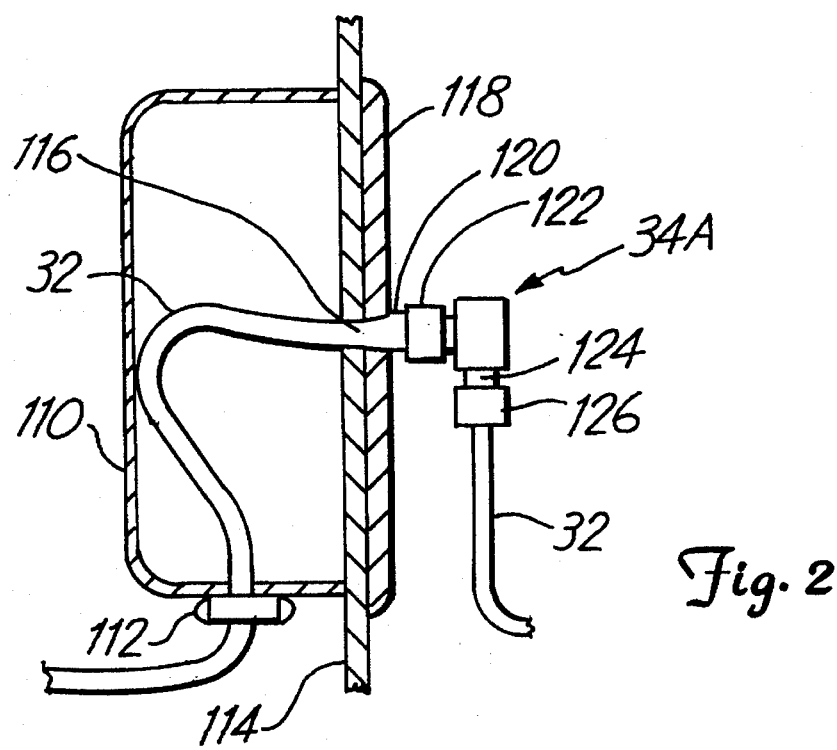
FIG. 2 is a partial sectional view of the electronic address tag.

FIG. 2 shows a physical installation of electronic room address tag 34A in greater detail. More specifically, FIG. 2 includes communication cable 32, electronic room address tag 34A, outlet box 110, clamp 112, wall 114, opening 116, outlet box cover 118, female connector 120, electronic room address tag male connector 122, electronic room address tag female connector 124, and male connector 126.

Communication cable 32 is secured to outlet box 110 using clamp 112. Communication cable 32 extends through outlet box 110 through opening 116 in wall 114, through outlet box cover 118, to female connector 120. Female connector 120 is connected to electronic room address tag male connector 122. Electronic room address tag 34's female connector 124 is also connected to communication cable's male connector 126.

As shown in FIG. 2, the electronic room address tag is easily adaptable to new or existing hotel pay-per-view systems using standard coaxial cable F-connectors. Also, electronic room address tag 34A is conveniently shaped in a right angle (as shown in FIG. 2) for minimizing interference with hotel furniture which may need to be located close to wall 114.

Figure 3:
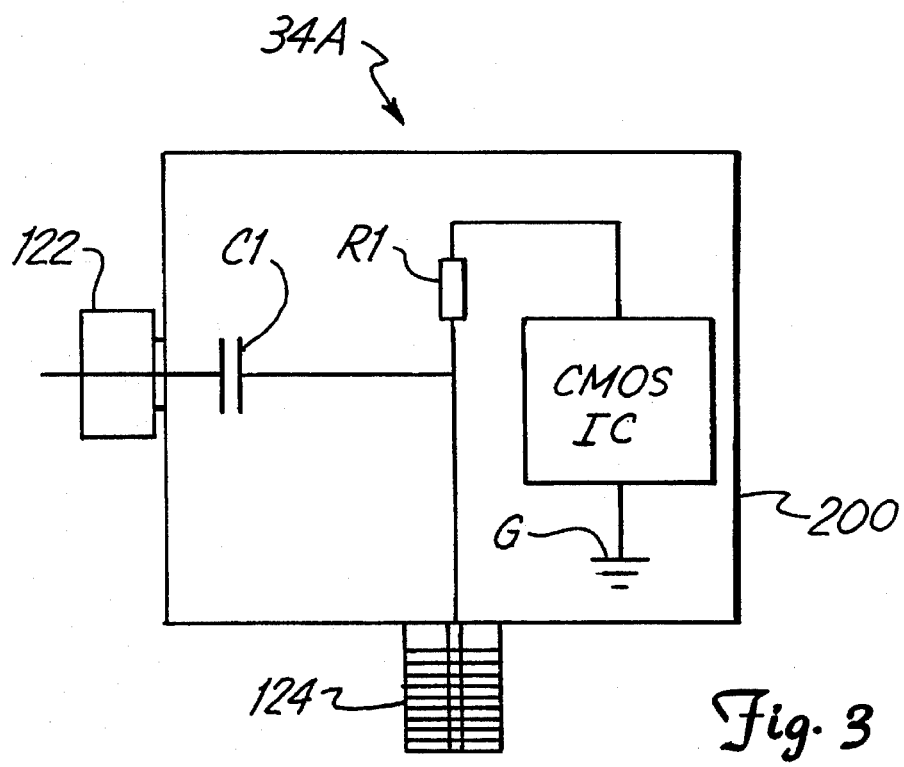
FIG. 3 is an electrical schematic of the electronic address tag.

FIG. 3 is an electrical schematic of electronic room address tag 34A. As shown in FIG. 3, electronic room address tag 34A includes male connector 122, female connector 124, housing 200, capacitor C1, resistor R1, complimentary metal oxide semiconductor integrated circuit (CMOS IC), and ground G.

Electronic room address tag 34A is contained within housing 200. Male connector 122 and female connector 124 extend from housing 200 for connection to communication link 32. More specifically, capacitor C1 is connected between male connector 122 and female connector 124. Resistor R1 is connected between female connector 124 and CMOS IC. CMOS IC is connected between resistor R1 and ground G.

Signals transmitted between the central computer 30 and microcontroller 36A pass through electronic room address tag 34A between male connector 122 and female connector 124 with negligible attenuation by capacitor C1. Resistor R1 provides AC isolation so that a negligible portion of the AC signals are lost to CMOS IC. Capacitor C1 is a DC blocking capacitor for blocking DC signals through electronic room address tag 34A.

A unique address is stored internally in CMOS IC. Microcontroller 36A reads the unique address through communication cable 32 using DC pulsing. In this way, other video AC signals present on communication cable 32 are not disturbed.

In one embodiment, CMOS IC is Dallas Semiconductor DS2400. The DS2400 is a silicon semiconductor which has a unique 48 bit silicon serial number laser recorded into the IC at the time of manufacture. This allows an almost infinite number ($10^{TM}$ combinations) of unique address combinations which can be manufactured and deployed without the chance of duplicating any two room addresses. The unique address may not be manually changed by a hotel guest.

The DS2400 requires very little power for operation. Power for reading and writing is derived from microcontroller 36A through communication cable 32. There is no need for an external power source. Power to the DS2400 is derived from a high going DC pulse at the beginning of a write or read time slot.

The DS2400 requires only one data input through communication cable 32 and a connection to ground G. The DS2400 has four separate states which include reset, issue a command word, read the type identifier number, and read the unique silicon serial number address. These states are triggered by DC pulses sent to CMOS IC from microcontroller 36A.

In operation, for example, electronic room address tag 34A receives a DC reset pulse from microcontroller 36A through communication cable 32. The DS2400 then generates a presence detect signal to notify microcontroller 36A that the DS2400 is attached to communication cable 32. Next, a command word is transmitted from microcontroller 36A to DS2400 using DC pulses. Upon recognition of the command word, the DS2400 responds to microcontroller 36A with a type identifier number. After the type identifier number is received by microcontroller 36A, the DS2400 outputs the unique 48 bit serial number contained within the DS2400 to microcontroller 36A. Microcontroller 36A may reset the DS2400 at any time by issuing a DC reset pulse.

As shown in FIG. 3, the electronic room address tag has many advantages. Its components are efficiently contained within a relatively small housing. The electronic room address tag is easily adaptable to existing cable TV and pay-per-view systems. The electronic room address tag connectors easily screw onto existing hotel entertainment system or cable TV wall plate or coaxial cable female F-connectors and male F-connectors. The CMOS IC contains a unique address which is easily accessed by entertainment system microcontroller through the use of DC pulsing. Hotel guests can not manually change the unique address with the electronic room address tag, which solves post problems of hotel guests attempting to manually change a microcontroller address to avoid paying for non-complementary services.

Figure 4:
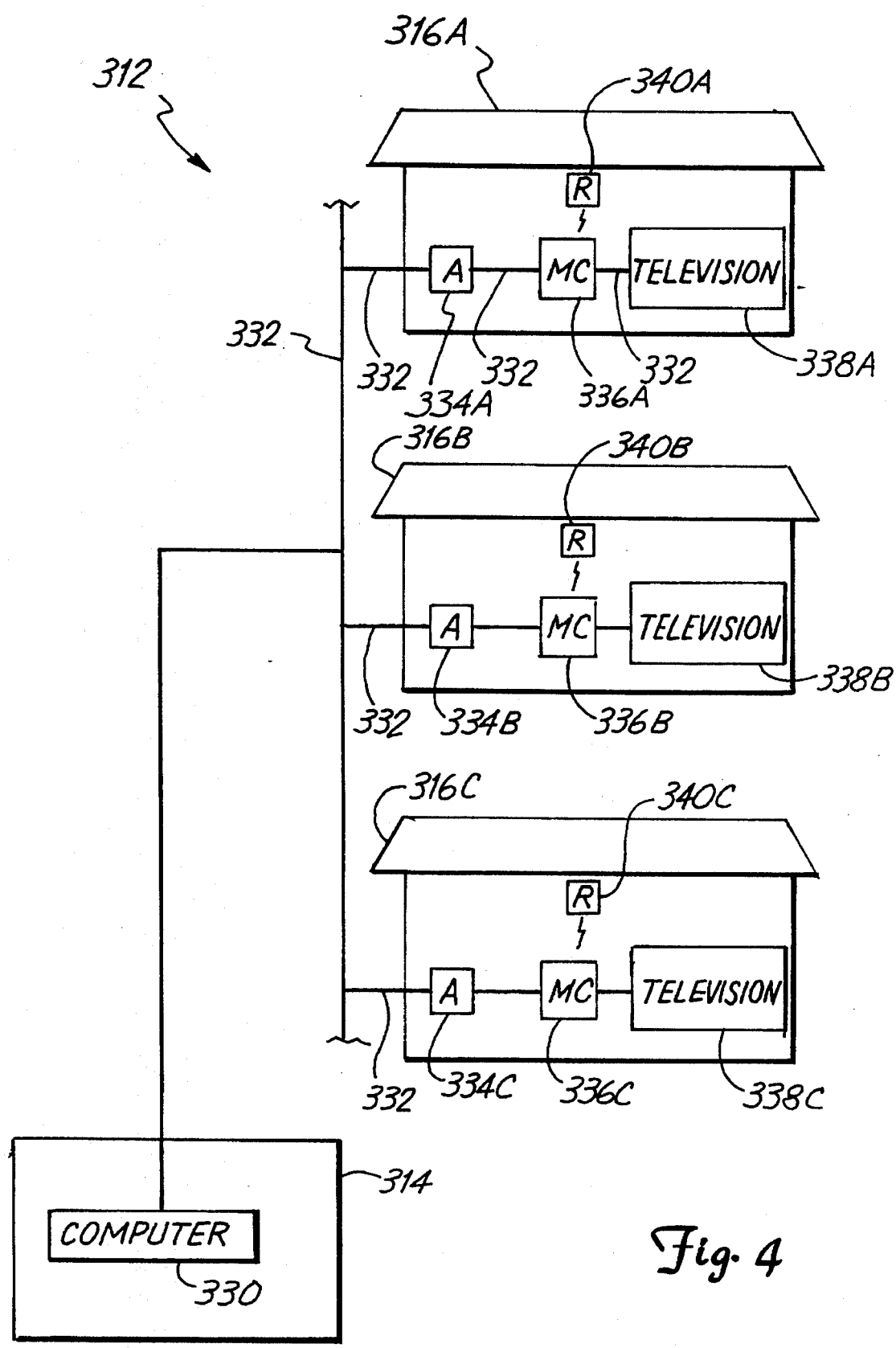
FIG. 4 is a diagram of an alternative embodiment of the electronic address tag.

FIG. 4 shows an alternative embodiment of the present invention. This embodiment includes of the use of an electronic room address tag (or, in this case, electronic home address tag) in a cable TV (CATV) system 312. The CATV system 312 includes video distribution center 314, customer residences 316A, 316B, and 316C, central computer 330, communication cable 332, electronic address tags 334A, 334B, and 334C, microcontrollers 336A, 336B, and 336C, televisions 338A, 338B, and 338C, and remote control units 340A, 340B, and 340C. Like a pay-per-view hotel entertainment system, video and communication signals are distributed between video distribution center 314 and televisions 338A, 338B, and 338C using communication cable 332. During this time, electronic room address tags 334A, 334B, and 334C allow computer 330 to monitor customer residences 316A, 316B, and 316C for video program and movie selections, usage, and billing purposes. In operation, the electronic room address tag feature of the present invention works the same in this environment as in the hotel environment described above, providing enhanced system integrity regarding component location, usage, tracking, and billing.

In summary, the use of an electronic room address tag in hotel entertainment systems and CATV systems provide many advantages. The electronic room address tag is easily adaptable to existing cable systems. The electronic room address tag is a great improvement over past addressable systems since it allows hotel televisions and associated control equipment to be changed out for maintenance purposes while allowing the same unique address to be associated with a given hotel room for non-complementary service selection and billing purposes. Hotel guests can not manually change the hotel room address within the electronic room address tag. It also solves past problems of hotel guests attempting to manually change a hotel room address or switching their television moving control box to avoid paying for rented movies. The use of the electronic room address tag provides a more efficient hotel entertainment system with accurate hotel guest billing, resulting in less loss of revenue to the hotel and greater customer satisfaction.

If a hotel guest were to physically steal the electronic room address tag and try to use it in a different hotel video entertainment system, the different hotel video entertainment system will not recognize the electronic room address tag. Since every electronic room address tag address is unique, that unique address would not be contained in the computer data base of the different hotel. Once an electronic room address tag is stolen from a hotel room, the central computer would look for that address and not find it. At that point, the central computer could alert an operator at the central computer and notify them that the electronic room address tag is missing.

The electronic room address tag is easily adaptable to many other information distribution systems. For example, electronic room address tags could be used to track food selection and billing of hotel guest room service restaurant orders using hotel entertainment system communication equipment. Also, in a pay-per-view movie system or CATV system, the electronic room address tag could be used for tracking interactive use of playing video games. For example, a customer could buy video game use in 10 minute increments or alternatively, the entertainment system could continually poll a customer's video game use and bill the customer on the amount of time played. The electronic room address tag is adaptable to any interactive device. For example, it may also be used for banking, shopping, making travel arrangements, or sending and receiving faxes.

Physically, the electronic room address tag may be located external to an existing hotel entertainment system outlet box or CATV outlet box as shown, or it may be embedded in the outlet box or adjacent wall itself. It is also recognized that an electronic room address tag may take on numerous shapes and sizes suitable for adaptation to existing and new hotel or CATV entertainment systems.

The electronic room address tag is also not limited by the communication link itself. For example, the communication link could be a standard CATV coaxial cable or alternatively, the electronic room address tag unique address may be communicated to the entertainment system using a wireless transmission such as a radio frequency (RF) signal.

Although the present invention has been described with reference to preferred embodiments, workers skilled in the art will recognize that changes may be made in form and detail without departing from the spirit and scope of the invention.

What is claimed is:

1. A device for associating an address with a remote location in a video distribution system having a central distribution point, a plurality of remote locations having at least one video control terminal located at each remote location, and a communication link for carrying signals between the central distribution point and each video control terminal at each remote location, the device being located at each remote location, the device comprising:

a housing;

connection means extending from the housing for connecting the device to the communication link and to each video control terminal at the remote location; and address means within the housing connected to the connection means for associating a unique address with the remote location, wherein each video control terminal is separable from the address means and is capable of reading from the address means the unique address associated with the remote location.

2. The device of claim 1 wherein the connection means includes a male connector and a female connector, the male connector extending from the housing for coupling to a video outlet of a video distribution system, the video outlet being part of the communication link, and the female connector extending from the housing for coupling to a communication cable, the communication cable being part of the communication link.

3. The device of claim 1 including means for receiving power using the communication link without affecting signals present on the communication link.

4. The device of claim 3 wherein the power is provided by data pulses received from each video control terminal.

5. The device of claim 1 wherein the device is installable in an existing video distribution system without any additional external wires and cables.

6. The device of claim 1 wherein the device unique address cannot be manually changed by a customer.

7. The device of claim 1 wherein the device is located adjacent to a video outlet box located at the remote location.

8. The device of claim 1 including AC signal isolation means for isolating AC signals from the address means.

9. The device of claim 1, including DC blocking means for blocking DC signals present on the communication link from passing through the device.

10. A video distribution system for distributing signals between a central distribution point and a plurality of video control terminals, the central distribution point being located at a central location and the video control terminals being located at remote locations, the system including a communication link connecting the central distribution point and video control terminals, the communication link being used for carrying the signals between the central location distribution point and the plurality of video control terminals, the video control terminal including a television and a microcontroller, the microcontroller having a non-volatile memory, the system further including:

address means located at each remote location separate from the video control terminal for associating a unique address with the remote location;

connection means extending from the address means for connecting the address means to the communication link;

initialization means for storing a unique remote location number at the video control terminal;

reading means for reading the unique remote location unique number and storing the unique remote location number at the video control terminal;

polling means located at the central distribution point for polling each video control terminal's unique remote location number and each address means unique address;

associating means for associating each unique remote location number with the corresponding address means unique address to form an index number for each remote location; and video distribution control means for using the index number to poll each remote location for tracking video selection and video control terminal use, the video distribution control means maintaining the index number associated with each corresponding remote location after removal of any of the video control terminals and subsequently the substitution of a different video control terminal at the same remote location.

11. The video distribution system of claim 10 wherein the different video control terminal reads the address means unique address into memory, and subsequently wherein the video distribution control means stores the index number and remote location number corresponding to the unique address at the video control terminal.

12. The video distribution system of claim 10 wherein the communication link simultaneously carries a unique video signal to each remote location.

13. The video distribution system of claim 12 wherein the communication link simultaneously carries the same video signal to a plurality of video control terminals while carrying unique video signals to other video control terminals.

14. The video distribution system of claim 12 and further including:

power supply means separate from the address means for supplying power to the address means using the communication link without affecting video signal present on the communication link.

15. A method of associating a unique address with a remote location in a centralized video distribution system comprising the steps of:

providing a communication link for carrying video signals between a central distribution point and a plurality of video control terminals located at remote locations;

providing an address device having an internally stored unique address at each remote location;

connecting the address device at each remote location to the communication link;

initializing a video control terminal at each remote location by inputting numbers representative of the remote location using a remote control unit at the remote location;

storing the representative numbers in a non-volatile memory located in the video control terminal;

polling each remote location from the central distribution point for video control terminal remote location numbers;

reading the unique address from the address device associated at the corresponding remote location and storing the unique address at the corresponding video control terminal;

compiling a database of unique addresses corresponding with physical remote location numbers to form an index number for each remote location; and maintaining the unique address associated with each remote location after removal of the video control terminal at a given remote location and subsequently the substitution of a different video control terminal at the same remote location.

16. The method of claim 15 and further including:

supplying power to the address device using the communication link without affecting video signal present on the communication link.

17. The method of claim 15 further including reading of the remote location unique address by the different video control terminal and storing the unique address at the different video control terminal.

18. The method of claim 17 further including assigning the index number and room number which corresponds to the unique address to the different video control terminal.

* * * * *